United States Patent
Krohn

(10) Patent No.: US 12,316,618 B2
(45) Date of Patent: *May 27, 2025

(54) SECURELY RECORDING AND RETRIEVING ENCRYPTED VIDEO CONFERENCES

(71) Applicant: Zoom Video Communications, Inc., San Jose, CA (US)

(72) Inventor: Max Krohn, New York City, NY (US)

(73) Assignee: Zoom Communications, Inc., San Jose, CA (US)

( * ) Notice: Subject to any disclaimer, the term of this patent is extended or adjusted under 35 U.S.C. 154(b) by 252 days.

This patent is subject to a terminal disclaimer.

(21) Appl. No.: 18/124,640

(22) Filed: Mar. 22, 2023

(65) Prior Publication Data
US 2023/0224286 A1    Jul. 13, 2023

Related U.S. Application Data

(63) Continuation of application No. 17/162,382, filed on Jan. 29, 2021, now Pat. No. 11,637,818.

(51) Int. Cl.
*H04L 9/40*    (2022.01)
*H04L 9/08*    (2006.01)
(Continued)

(52) U.S. Cl.
CPC ........ *H04L 63/0457* (2013.01); *H04L 9/0822* (2013.01); *H04L 9/0825* (2013.01);
(Continued)

(58) Field of Classification Search
CPC . H04L 63/0457; H04L 9/0822; H04L 9/0825; H04L 9/0833; H04L 9/0894;
(Continued)

(56) References Cited

U.S. PATENT DOCUMENTS 9,432,189 B1    8/2016  Wu
10,785,450 B1    9/2020  Van Rensburg
(Continued)

OTHER PUBLICATIONS

U.S. Appl. No. 17/162,382, "Non-Final Office Action", dated Jun. 13, 2022, 15 pages.
(Continued)

*Primary Examiner* — Quazi Farooqui
(74) *Attorney, Agent, or Firm* — Kilpatrick Townsend & Stockton LLP

(57) ABSTRACT

One disclosed example method includes obtaining a meeting cryptographic key; transmitting, from a client device to a video conference provider, a request to initiate an encrypted video conference, the encrypted video conference including a plurality of participants; distributing the meeting cryptographic key to each participant of the plurality of participants; obtaining a public cryptographic key of a key pair, the key pair including the public cryptographic key and a private cryptographic key; encrypting the meeting cryptographic key using the public cryptographic key; transmitting, from the client device to the video conference provider, a request to record the video conference; encrypting audio and video from a microphone and image sensor of the client device using the meeting cryptographic key; transmitting the encrypted audio and video to the video conference provider; and providing the encrypted meeting cryptographic key to the video conference provider.

20 Claims, 11 Drawing Sheets

(51) Int. Cl.
*H04L 9/14* (2006.01)
*H04N 7/15* (2006.01)

(52) U.S. Cl.
CPC .......... *H04L 9/0833* (2013.01); *H04L 9/0894* (2013.01); *H04L 9/14* (2013.01); *H04N 7/15* (2013.01)

(58) Field of Classification Search
CPC . H04L 9/14; H04L 2463/062; H04L 63/0435; H04L 63/061; H04L 63/065; H04L 65/1069; H04L 65/403; H04L 9/40; H04N 7/15; H04W 12/03; H04W 12/041
See application file for complete search history.

(56) References Cited

U.S. PATENT DOCUMENTS

| | | |
|---|---|---|
| 11,637,818 B2 | 4/2023 | Krohn |
| 2016/0321290 A1 | 11/2016 | Luthra et al. |
| 2019/0149348 A1 | 5/2019 | Antopolsky et al. |
| 2019/0294804 A1 | 9/2019 | Di Lella et al. |
| 2020/0228973 A1* | 7/2020 | Kasabwala ........... H04L 9/0861 |
| 2020/0344058 A1 | 10/2020 | Wang et al. |

OTHER PUBLICATIONS

U.S. Appl. No. 17/162,382, "Notice of Allowance", dated Dec. 14, 2022, 10 pages.
U.S. Appl. No. 17/162,382, "Notice of Allowance", dated Sep. 30, 2022, 10 pages.
PCT/US2022/012241, "International Preliminary Report on Patentability", dated Aug. 10, 2023, 11 pages.
PCT/US2022/012241, "International Search Report and Written Opinion", dated Apr. 8, 2022, 14 pages.

* cited by examiner

SECURELY RECORDING AND RETRIEVING ENCRYPTED VIDEO CONFERENCES

CROSS-REFERENCE

This application is a continuation of U.S. patent application Ser. No. 17/162,382, filed Jan. 29, 2021, titled "Securely Recording and Retrieving Encrypted Video Conferences," the entirety of which is hereby incorporated by reference.

FIELD

The present application generally relates to hosting or participating in video conferences and more particularly relates to systems and methods for recording encrypted video conferences.

BACKGROUND

Videoconferencing has become a common way for people to meet as a group, but without being at the same physical location. Participants can be invited to a video conference meeting, join from their personal computers or telephones, and are able to see and hear each other and converse largely as they would during an in-person group meeting or event. The advent of user-friendly video conferencing software has enabled teams to work collaboratively despite being dispersed around the country or the world. It has also enabled families and friends to engage with each other in more meaningful ways, despite being physically distant from each other.

SUMMARY

Various examples are described for systems and methods for securely recording and retrieving encrypted video conferences. One example method includes obtaining a meeting cryptographic key; transmitting, from a client device to a video conference provider, a request to initiate an encrypted video conference, the encrypted video conference including a plurality of participants; distributing the meeting cryptographic key to each participant of the plurality of participants; obtaining a public cryptographic key of a key pair, the key pair including the public cryptographic key and a private cryptographic key; encrypting the meeting cryptographic key using the public cryptographic key; transmitting, from the client device to the video conference provider, a request to record the video conference; encrypting audio and video from a microphone and image sensor of the client device using the meeting cryptographic key; transmitting the encrypted audio and video to the video conference provider; and providing the encrypted meeting cryptographic key to the video conference provider.

Another example method includes initiating, by a video conference provider, an encrypted video conference; receiving and storing, by the video conference provider, encrypted streams of audio and video from a plurality of participants in the video conference, the encrypted audio and video encrypted by the respective participants using a meeting cryptographic key, wherein the video conference provider does not have access to the meeting cryptographic key; providing multiplexed encrypted streams of audio and video to the participants; receiving and storing an encrypted meeting cryptographic key; associating the encrypted audio and video with the encrypted meeting cryptographic key; receiving, by the video conference provider after the videoconference has ended, a request for the stored encrypted audio and video and the encrypted meeting cryptographic key; providing, in response to the request, the stored encrypted audio and video and the encrypted meeting cryptographic key.

One example system includes a non-transitory computer-readable medium; a communications interface; a microphone; an image sensor; and a processor communicatively coupled to the non-transitory computer-readable medium, the communications interface, the microphone, and the image sensor the processor configured to execute processor-executable instructions stored in the non-transitory computer-readable medium to receive audio from the microphone and video from the image sensor; obtain a meeting cryptographic key; transmit, to a video conference provider, a request to initiate an encrypted video conference, the encrypted video conference including a plurality of participants; distribute the meeting cryptographic key to each participant of the plurality of participants; obtain a public cryptographic key of a key pair, the key pair including the public cryptographic key and a private cryptographic key; encrypt the meeting cryptographic key using the public cryptographic key; transmit, to the video conference provider, a request to record the video conference; encrypt audio and video from a microphone and image sensor of the client device using the meeting cryptographic key; transmit the encrypted audio and video to the video conference provider; and transmit the encrypted meeting cryptographic key to the video conference provider.

Another example system includes a non-transitory computer-readable medium; a communications interface; and a processor communicatively coupled to the non-transitory computer-readable medium and the communications interface, the processor configured to execute processor-executable instructions stored in the non-transitory computer-readable medium to initiate an encrypted video conference; receive and store encrypted streams of audio and video from a plurality of participants of the video conference, the encrypted audio and video encrypted by the respective participants using an encrypted meeting cryptographic key, wherein the processor does not have access to the meeting cryptographic key; multiplex the encrypted streams of audio and video and provide multiplexed encrypted streams of audio and video to the participants; receive and store an encrypted meeting cryptographic key; associate the encrypted audio and video with the encrypted meeting cryptographic key; terminate the encrypted video conference; receive a request for the stored encrypted audio and video and the encrypted meeting cryptographic key; provide, in response to the request, the stored encrypted audio and video and the encrypted meeting cryptographic key.

One example non-transitory computer-readable medium includes processor-executable instructions configured to cause a processor to receive audio from a microphone and video from an image sensor; obtain a meeting cryptographic key; transmit, to a video conference provider, a request to initiate an encrypted video conference, the encrypted video conference including a plurality of participants; distribute the meeting cryptographic key to each participant of the plurality of participants; obtain a public cryptographic key of a key pair, the key pair including the public cryptographic key and a private cryptographic key; encrypt the meeting cryptographic key using the public cryptographic key; transmit, to the video conference provider, a request to record the video conference; encrypt audio and video from a microphone and image sensor of the client device using the meeting cryptographic key; transmit the encrypted audio and video to the video conference provider; and transmit the encrypted meeting cryptographic key to the video conference provider.

Another example non-transitory computer-readable medium includes processor-executable instructions configured to cause a processor to initiate an encrypted video conference; receive and store encrypted streams of audio and video from a plurality of participants of the video conference, the encrypted audio and video encrypted by the respective participants using an encrypted meeting cryptographic key, wherein the processor does not have access to the meeting cryptographic key; multiplex the encrypted streams of audio and video and provide multiplexed encrypted streams of audio and video to the participants; receive and store an encrypted meeting cryptographic key; associate the encrypted audio and video with the encrypted meeting cryptographic key; terminate the encrypted video conference; receive a request for the stored encrypted audio and video and the encrypted meeting cryptographic key; provide, in response to the request, the stored encrypted audio and video and the encrypted meeting cryptographic key.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
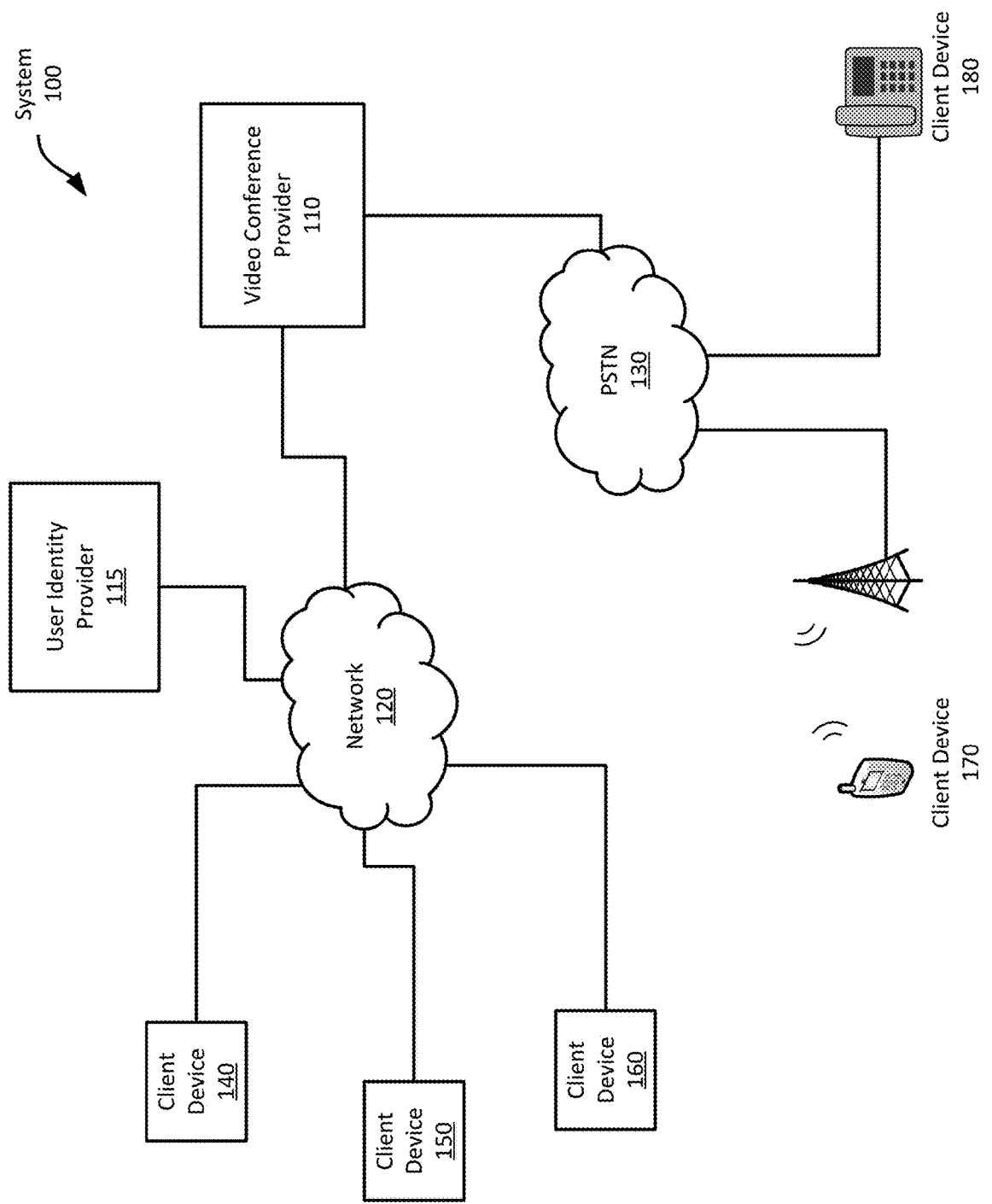
FIGS. 1-4 show example systems for securely recording and retrieving encrypted video conferences.

Examples are described herein in the context of systems and methods for securely recording and retrieving encrypted video conferences. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

People participate in video conferences for a wide variety of reasons, such as to keep in touch with family, conduct business, or manage groups or organizations. In some cases, participants in a video conference may wish to keep the contents of the video conference confidential and only available to certain authorized personnel. This can be done by encrypting audio and video that is streamed between participants to a video conference, which may prevent potential eavesdroppers from accessing the streamed audio and video. Without the necessary decryption information, accessing the encrypted audio and video can be prohibitively computationally difficult. However, in some scenarios, audio and video data may be decrypted during the course of an encrypted video conference.

For example, some video conference providers offer the option of recording a video conference. In some examples, the video conference provider itself, being the nexus through which the audio and video traverses, will record the meeting and provide access to the recorded meeting to one or more of the participants. However, to perform this functionality, the video conference provider needs to decrypt the audio and video for recording, even if the recorded audio and video is subsequently encrypted. Thus, the video conference provider has access to the encrypted audio and video of the video conference. Such a scenario may be undesirable for any number of reasons. For example, the video conference provider's servers may be "untrusted" by the participants, meaning the provenance and identity of the servers may not be verifiable by the participants or may otherwise be suspect. In some cases, the audio or video may include confidential information that may not be shared with the video conference provider, e.g., by law or regulation. Further, the participants themselves may simply not want the video conference provider to have access to the content of the video conference.

To provide security for the video conference, the participants may use an option to encrypt audio and video data between the participants and distribute cryptographic information amongst the participants without sharing that cryptographic information with the video conference provider. Thus, all of the participants are able to receive encrypted audio and video and decrypt it, but while the video conference provider continues to receive the encrypted video and audio and distribute it to the participants, it is unable to decrypt it. However, this presents a problem for participants that would like to have the meeting recorded because, while the video conference provider can store the encrypted data, it does not have the keys used to encrypt and decrypt the audio and video. Further, the keys used during the video conference are discarded either during the video conference (due to rotating to new encryption keys) or when the video conference ends.

To enable the video conference provider to record an encrypted video conference and allow one or more participants to later retrieve the recorded video conference and access it, the host requests that the video conference initiate an encrypted video conference and the host generates a meeting cryptographic key, e.g., a symmetric encryption key. In addition, the host obtains, e.g., by generating an asymmetric cryptographic key pair, a public key of a cryptographic key pair, which it uses to encrypt the meeting cryptographic key.

During the video conference, the participants employ the meeting cryptographic key to encrypt the audio and video, which is received and stored by the video conference provider as well as distributed to the various participants to enable them to participate in the video conference. In addition, the host provides the encrypted meeting cryptographic key to the video conference provider, which associates it with the encrypted audio and video.

During the video conference, the host may rotate through multiple meeting cryptographic keys, thereby causing the video conference to be encrypted using different keys over time. For each key rotation, the new meeting cryptographic key is encrypted (using the previously obtained public key) and uploaded to the video conference provider, which associates it with the recorded encrypted video conference.

Once the meeting is over, the host (or other meeting participant) can subsequently retrieve the encrypted audio and video as well as the encrypted meeting cryptographic key(s) provided to the video conference provider. The host uses the private key corresponding to the public key used to encrypt the meeting cryptographic key (or keys, if multiple meeting cryptographic keys were used). It can then decrypt the audio and video using the decrypted meeting cryptographic key(s).

By using such a technique, the encrypted audio and video is secure while it is saved at the video conference provider. The decryption key is also stored with the video conference provider, however, because it is encrypted, it is inaccessible. Further, while the host in this example is described as generating the cryptographic key pair, the public key may instead be provided by a key management server, such as one hosted by a customer of the video conference provider. Thus, the host may never have access to the private key needed to decrypt the video conference before it is provided to the video conference provider. Instead, the host may need to request decryption of the private key at a later time, which may require authentication to the key management service, thereby further ensuring the security of the audio and video from the video conference.

Using such techniques, hosts and participants in a video conference may enjoy privacy for their communications and ensure that access to a video conference recording is similarly restricted. As noted above, this can help comply with various privacy regulations or ensure that other attempts to access the encrypted recording must be mediated by the host (or corresponding entity, such as the host's employer).

This illustrative example is given to introduce the reader to the general subject matter discussed herein and the disclosure is not limited to this example. The following sections describe various additional non-limiting examples and examples of systems and methods for securely recording and retrieving encrypted video conferences.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 120 can be located within a private network to provide video conferencing services to devices within the private network, or it can be connected to a public network, e.g., the internet, so it may be accessed by anyone. Some examples may even provide a hybrid model in which a video conference provider 120 may supply components to enable a private organization to host private internal video conferences or to connect its system to the video conference provider 120 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
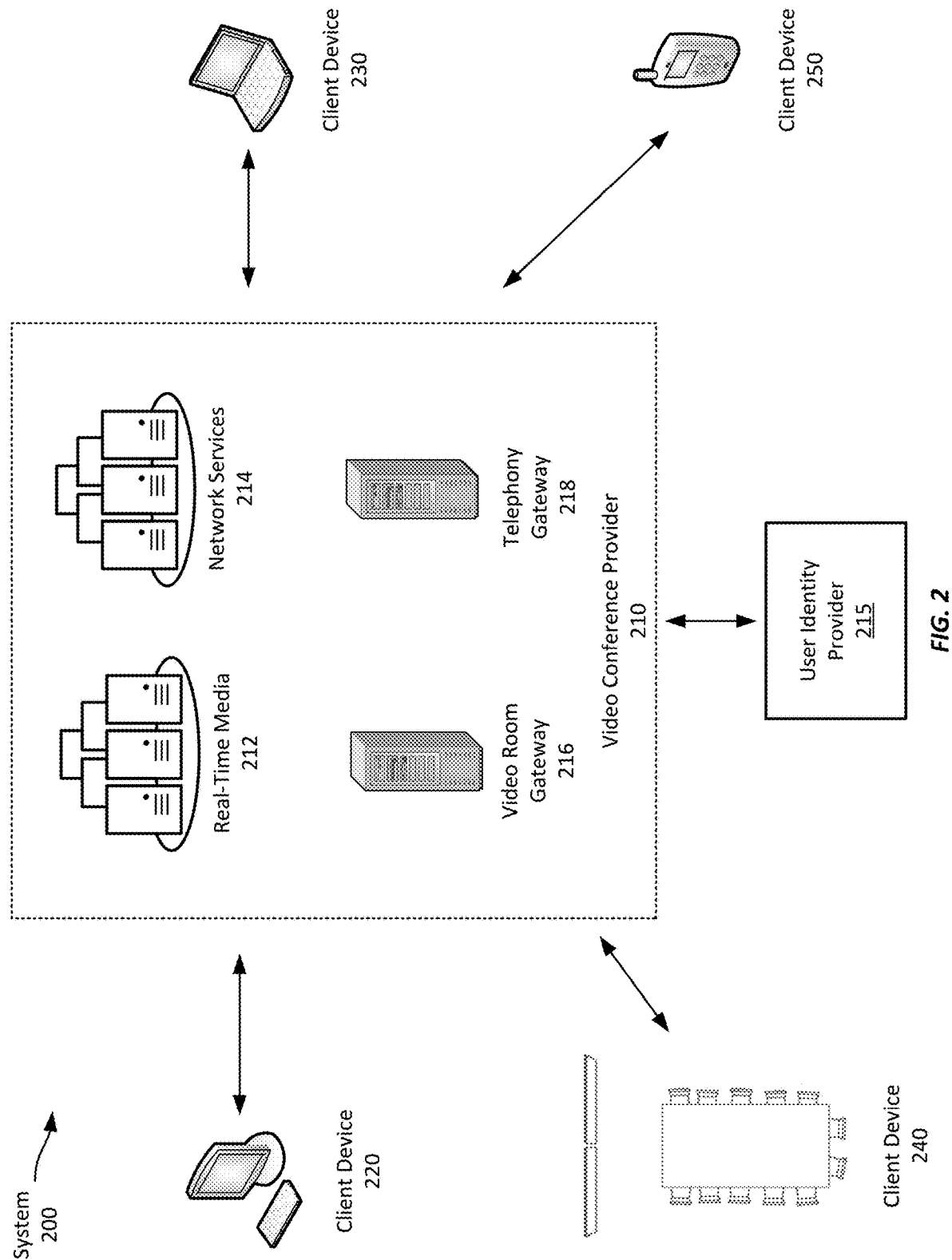

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can making conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider.

The video room gateway servers 216 provide specialized authentication and communication with the dedicated video conferencing hardware that may not be available to other client devices 220-230, 250. For example, the video conferencing hardware may register with the video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
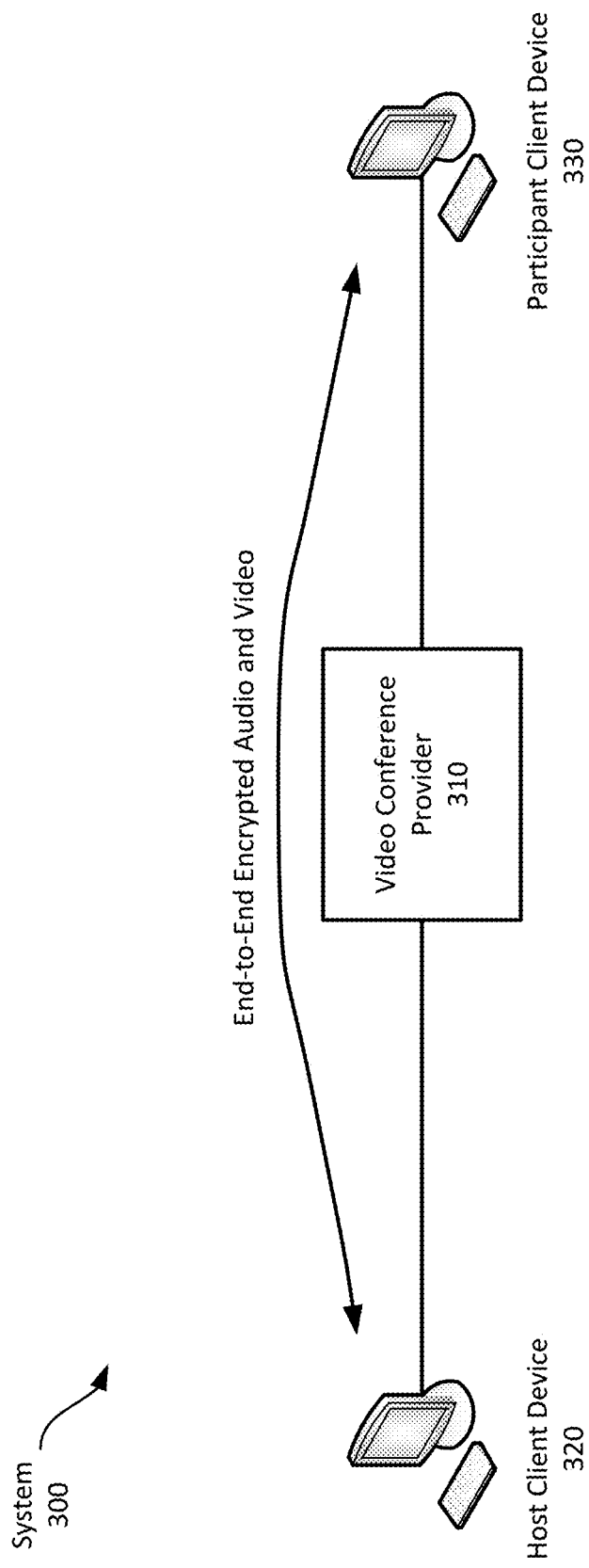

Referring now to FIG. 3, FIG. 3 illustrates a simplified system 300 that enables the users to engage in an end-to-end ("E2E") encrypted video conference. The system includes two client devices 320, 330 and a video conference provider 310. The client devices 320, 330 are connected to the video conference provider 310 through one or more communication networks (not shown), generally as described above with respect to FIGS. 1 and 2.

In an E2E-encrypted video conference, each participant joins the video conference with their respective client device 320-330 and the host establishes a meeting key, e.g., a symmetric cryptographic key, that will be used to encrypt and decrypt the audio and video streams. Each of the participants also has their own respective public/private key pair that can be used to communicate with the respective participant and each participant's public key is published or distributed in any suitable manner, such as by registering it with a trusted entity or by generating a cryptographic signature using a private key and allowing the host or other participants to use a published copy of the public key to verify the signature.

Once each participant's public key has been verified, the host can securely distribute the meeting key to the participants by encrypting the meeting key using the participant's respective public keys. For example, the host may generate and send an encrypted message including the meeting key to each participant using the respective participant's public key. Upon receiving successfully decrypting the meeting key, the respective participants are then able to encrypt and decrypt meeting content.

In system 300 shown in FIG. 3, client device 320 initially connects to the video conference provider 310 and requests that the video conference provider create a new meeting. Once the meeting is created, client device 320 is designated as the host of the meeting and establishes a meeting key to use to provide for E2E encryption in the meeting, but does not provide it to the video conference provider 310. Subsequently, a participant client device 330 joins the meeting and generates and provides a cryptographically signed message using its private key to the host client device 320, which verifies the message using the participant's public key. After verifying the public key, the host client device 320 encrypts the meeting key using the participant's public key and transmits it to the participant client device 330, which decrypts the meeting key. Once the meeting key has been successfully received and decrypted by the participant client device 330, it may begin transmitting encrypted audio and video using the meeting key.

In this example, each participant generates a per-stream encryption key by computing a new key using a non-secret stream ID for each data stream it transmits (e.g., audio and video), and uses the corresponding stream encryption key to encrypt its audio and video stream(s). The video conference provider receives the various encrypted streams, multiplexes them generally as described above with respect to FIGS. 1 and 2, and distributes them to the various participating client devices 320, 330. The respective client devices 320, 330 can then use the meeting key to decrypt the incoming streams and view the content of the video conference.

However, as part of this process, the video conference provider 310 does not have access to the meeting key. Thus, the video conference provider 310 is unable to decrypt the various audio and video streams. But because the individual streams are separately received from the various participants, the video conference provider 310 is able to identify the source of each stream and therefore it can properly multiplex the streams for delivery to each participant.

A consequence of the video conference provider 310 lacking access to the meeting key is that it cannot decrypt the audio and video streams to record them. Further, and as alluded to above, the meeting key is discarded by the various clients once the meeting has ended. Thus, recording meetings in an E2E-encrypted meeting becomes problematic.

To enable recording and later playback of an E2E-encrypted meeting, the host client device 320 may send a message to the video conference provider to record the meeting. The host client device 320 may then encrypt the meeting key using one key of an encryption key pair and send the encrypted meeting key to the video conference provider 310. The video conference provider 310 receives the encrypted meeting key and associates it with the meeting. It also begins storing the encrypted audio and video streams from the various participants. Once the meeting concludes, the host or a participant may request the recorded encrypted audio and video data as well as the encrypted meeting key from the video conference provider 310.

The requesting client device can then decrypt the meeting key, so long as it has access to the other key of the encryption key pair used to encrypt the meeting key. Once it has access to the meeting key, it may decrypt the audio and video data and perform any additional processing needed on the data, such as encoding it into a suitable format, e.g., mp4.

Figure 4:
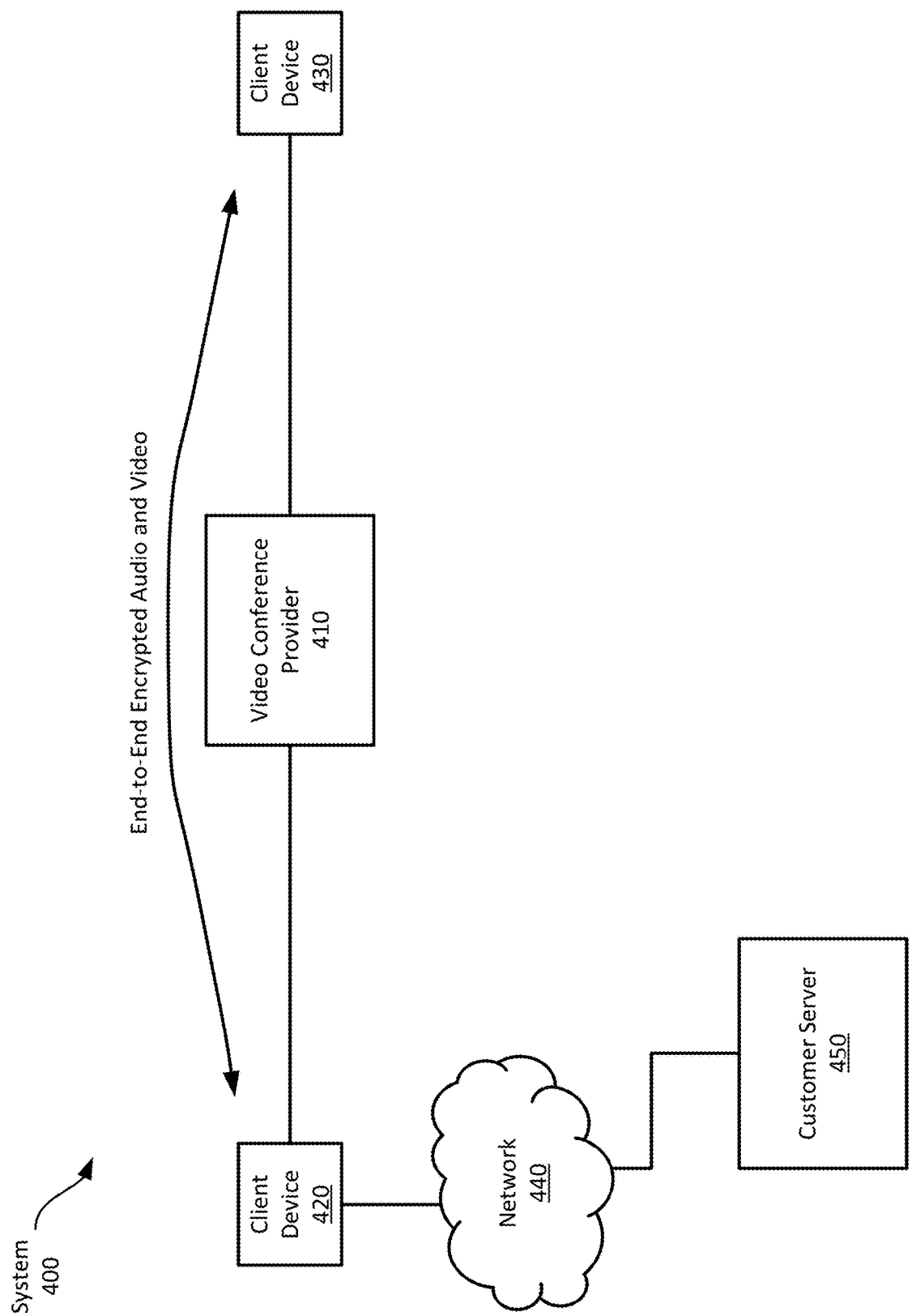

FIG. 4 shows another example system 400 for securely recording and retrieving encrypted video conferences. In this example, the host's client device 420 is connected to a private network 440 within the host's company or organization, which is a customer of the video conference provider 410. The customer also maintains a server 450 that can provide encryption key information and can perform decryption and encoding functionality on decrypted audio and video.

In this example, when the host's client device 420 establishes the meeting, it generates and distributes the meeting key generally as discussed above with respect to FIG. 3. In addition, it also requests a key from the customer server 450, which generates a new encryption key pair and provides one of the keys (referred to as the "public" key of the key pair) to the host's client device. The public key is then used to encrypt the meeting key. The encrypted meeting key is then provided to the video conference provider 410 as discussed above with respect to FIG. 3. However, the second key (the "private" or "secret" key) is maintained by the server 450, associated with the meeting, and not shared with the host's client device 420.

Once the meeting has concluded, the customer's server 450 can request the encrypted meeting recording and the encrypted meeting key from the video conference provider 410. The server 450 then decrypts the meeting key using the private key. It then uses the decrypted meeting key to decrypt the meeting recording. This allows the customer to maintain control over the recording because only it can decrypt the encrypted meeting key and the meeting recording. Further, it enables the customer to push computationally expensive processing to dedicated resources, such as a cloud environment, where the decryption and video/audio encoding can be performed, and it can store the decrypted, encoded recording at any suitable location for later retrieval by authorized personnel. Because this process is performed by the customer's server 450 (or other of the customer's computing resources), rather than one of the participants, the customer is able to maintain security over the meeting recording and only allow access to appropriate personnel within the customer's organization.

Figure 5:
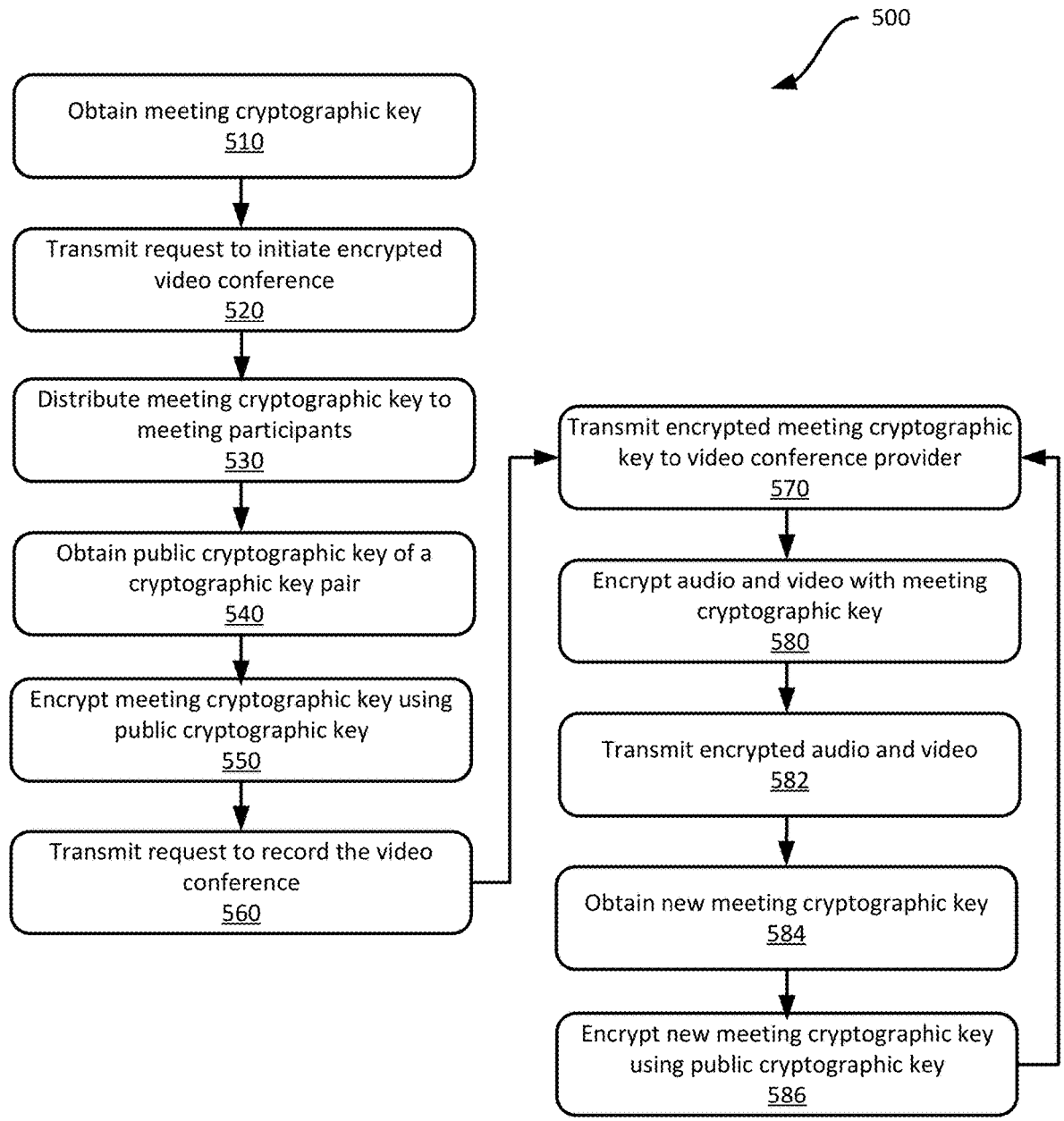
FIGS. 5-7 show example methods for securely recording and retrieving encrypted video conferences.

Referring now to FIG. 5, FIG. 5 shows an example method 500 for securely recording and retrieving encrypted video conferences. The method 500 of FIG. 5 will be described with respect to the systems shown in FIG. 4;

however any suitable system according to this disclosure may be employed, including any of the systems shown in FIG. 1-3 or 8.

At block 510, the host's client device 420 obtains a meeting cryptographic key. Any suitable technique for generating a meeting cryptographic key may be employed. For example, the meeting cryptographic key may include a cryptographic key pair generated according to any suitable cryptographic key pair technique, such as using elliptic curves. In some examples, the meeting cryptographic key may a single cryptographic key.

At block 520, the host's client device 420 transmits a request to the video conference provider 410 to initiate an encrypted video conference. The request may identify certain meeting information, such as a meeting identifier and passcode. It may also include one or more options for the meeting, including an option to employ E2E encryption. Alternatively, the request to employ E2E encryption may be sent separately from the request to initiate the meeting.

At block 530, the host's client device 420 distributes the meeting cryptographic key to each participant of the plurality of participants. For example, the host's client device may obtain public cryptographic keys from each participant in the encrypted video conference and, for each participant, encrypt a copy of the meeting cryptographic key using the respective participant's public key. The host's client device 420 may then transmit each encrypted meeting cryptographic key to the respective participant based on the public key used.

At block 540, the host's client device 420 obtains a public cryptographic key of a cryptographic key pair. As at block 510, any suitable technique for generating a cryptographic key pair may be employed. In this example, a key pair is generated using an elliptic curve function and the host's client device 420 obtains one of the cryptographic keys of the cryptographic key pair, which becomes the public cryptographic key. Further, in this example, the host's client device 420 requests the public cryptographic key from a remote computing device, such as the customer server 450. In some examples, however, the host's client device 420 itself may generate the cryptographic key pair and designate one of the cryptographic keys as the public key.

At block 550, the host's client device 420 encrypts the meeting cryptographic key using the public cryptographic key.

At block 560, the host's client device 420 transmits a request to the video conference provider 410 to record the video conference. In some examples, the request to record the video conference may be sent during the course of the video conference, while in some examples, the request to record may be sent prior to the meeting being initiated or may be configured as a meeting setting with the video conference provider 410 when the meeting is initially scheduled. Further, in some examples, the video conference provider 410 only allows the use of encrypted video conferences, in which case no request is transmitted.

At block 570, the host's client device 420 transmits the encrypted meeting cryptographic key to the video conference provider 410. In this example, the host's client device 420 transmits the encrypted meeting cryptographic key along with additional information to help associate the encrypted meeting cryptographic key, such as the meeting identifier, the date and time of the meeting, and the name of the host. However, in some examples, the host's client device 420 only transmits the encrypted meeting cryptographic key, and the video conference provider 410 maintains an association between the received encrypted meeting cryptographic key and the video conference.

In examples where the meeting cryptographic key changes during the video conference, the host's client device 420 may also transmit a notification to the video conference provider 410 an indication that the meeting cryptographic key has changed and a corresponding timestamp of when the participants changed to use the new meeting cryptographic key. In some examples, however, transmitting a new meeting cryptographic key provides the notification that the meeting cryptographic key has changed.

At block 580, the host's client device 420 begins encrypting audio and video obtained from a microphone and video capture device using the meeting cryptographic key. In this example, the video conference provider transmits a message to the participants to begin encrypting audio and video; however, in some examples, the participants, including the host, may begin encrypting audio and video immediately upon receiving the meeting cryptographic key.

At block 582, the host's client device 420 transmits the encrypted audio and video to the video conference provider 410. It also begins to receive multiplexed streams of audio and video from the video conference provider from the other participants. It should be appreciated that the functionality at blocks 570 and 580 continues throughout the video conference.

At block 584, the host's client device 420 obtains a new meeting cryptographic key generally as described above with respect to block 510 and then distributes the new meeting cryptographic key to the other participants generally as described above with respect to block 530. In some examples, the host's client device may periodically change meeting cryptographic keys, e.g., every 5 minutes, or it may continue to use the same meeting cryptographic key throughout the course of the video conference. In such an example, blocks 584 and 586 are not performed.

At block 586, the host's client device 420 encrypts the new meeting cryptographic key using the public cryptographic key generally as described above with respect to block 550, and the method returns to block 570.

It should be appreciated that the method 500 described above is only one example according to this disclosure. In other examples, the blocks described above may be performed in a different order or one or more blocks may be omitted. For example, the order of blocks 520-570 may occur in any suitable order according to different examples.

Figure 6:
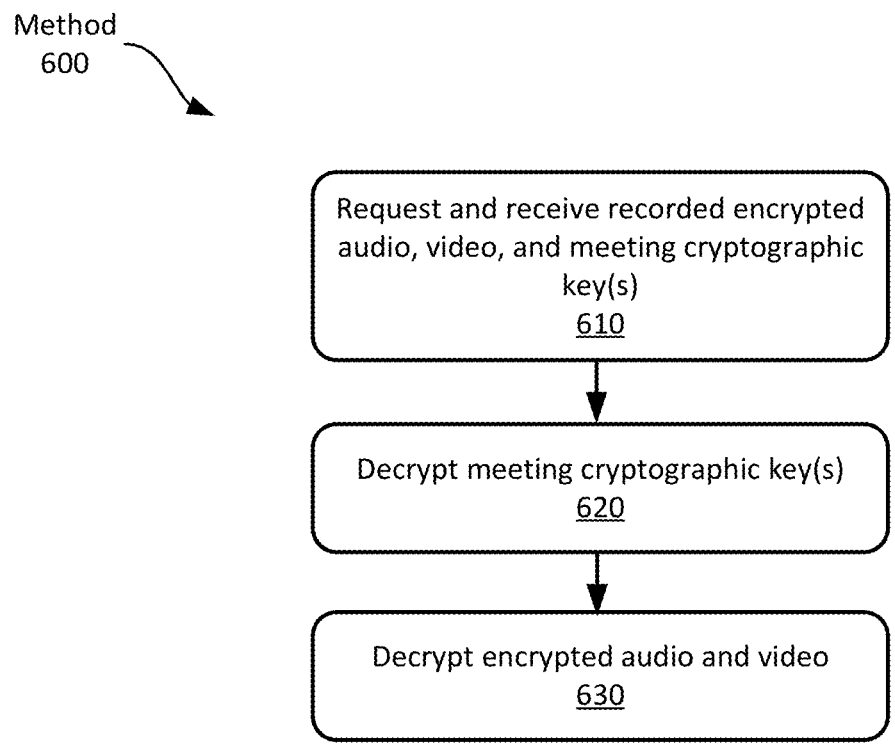

Referring now to FIG. 6, FIG. 6 shows an example method 600 for securely recording and retrieving encrypted video conferences. The method 600 of FIG. 6 will be described with respect to the systems shown in FIG. 4; however any suitable system according to this disclosure may be employed, including any of the systems shown in FIG. 1-3 or 8.

At block 610, the customer server 450 transmits a request to the video conference provider 410 to obtain recorded encrypted audio and video from a video conference and to obtain the corresponding encrypted meeting cryptographic key(s). In this example, the customer server 450 includes a meeting identifier, a meeting passcode, a host name, and the date and time when the meeting was scheduled to begin. In other examples, different information may be used. In some examples, the customer server 450 may provide credentials to access a customer account with the video conference provider 410. Once the customer server 450 has access to the customer account, it may be presented with available encrypted meeting recordings to select for retrieval. In response to the request, the video conference provider 410 transmits the recorded encrypted audio, video, and meeting cryptographic key(s).

In examples where multiple meeting cryptographic keys were used during a video conference, the customer server 450 may also obtain an indication from the video conference provider 410 regarding when each meeting cryptographic key began being used, e.g., by providing a timestamp corresponding to each meeting cryptographic key.

It should be appreciated that while the functionality described with respect to block 610 is made with respect to the customer server 450, any suitable computing device may perform such functionality, such as the host's client device 420.

At block 620, the customer server 450 decrypts the meeting cryptographic key(s). To do so, it accesses a key management system ("KMS") resident on the server 450 or at a remote computing device and requests the private cryptographic key corresponding to the public cryptographic key used to encrypt the meeting cryptographic key. In this example, the KMS maintains a record corresponding to each cryptographic key pair it manages along with corresponding meeting information, such as a meeting identifier, meeting host, a date and time when the meeting was scheduled to begin, etc. The customer server 450 supplies the necessary information to the KMS and receives, in response, the corresponding private cryptographic key, which it then uses to decrypt the meeting cryptographic key(s).

In some examples, block 620 may be performed by the host's client device 420 after the meeting has ended. As discussed above with respect to FIG. 5, in some examples, the host's client device 420 may generate the cryptographic key pair used to encrypt the meeting cryptographic key(s). In which case, the host's client device 420 may use the corresponding private key to decrypt the meeting cryptographic key(s).

At block 630, the customer server 450 decrypts the encrypted audio and video using the decrypted meeting cryptographic key(s). As discussed above with respect to FIG. 5, in some examples, the same meeting cryptographic key is used throughout the video conference, in which case, the customer server 450 decrypts the entire video conference using the same meeting cryptographic key. However, if multiple meeting cryptographic keys were used, the customer server 450 uses information supplied by the video conference provider 410, such as described above with respect to block 610, to decrypt the encrypted video and audio using the corresponding key. And while in this example, block 630 was performed by a customer server 450, in some examples, it may be performed by the host's client device 420.

Figure 7:
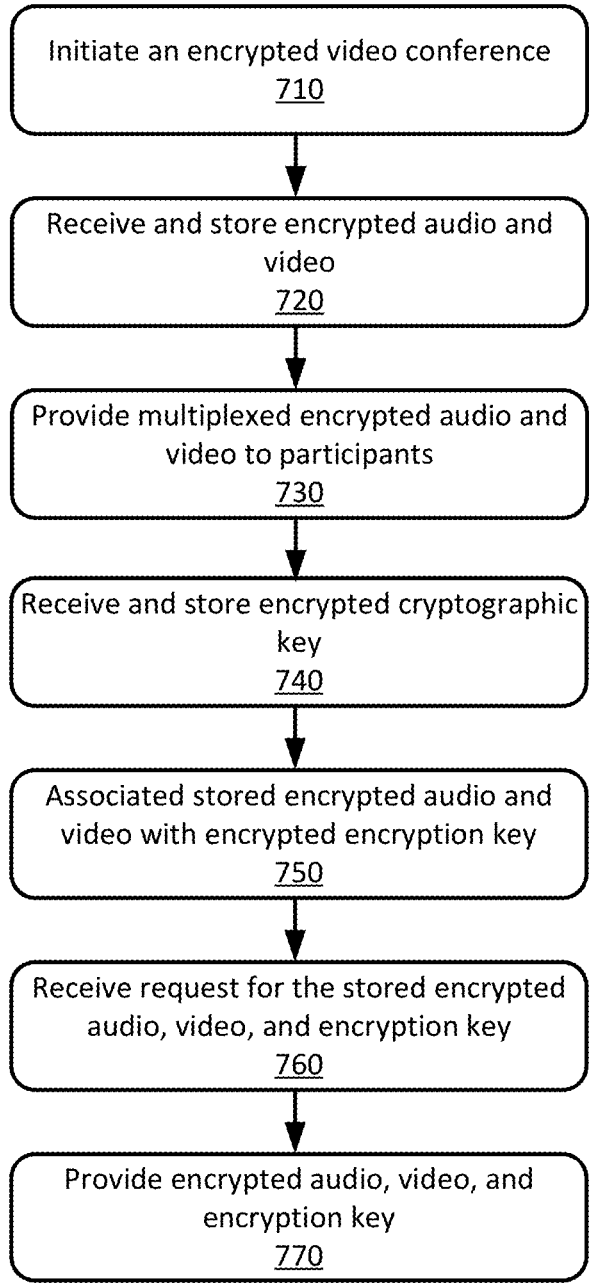

Referring now to FIG. 7, FIG. 7 shows an example method 700 for securely recording and retrieving encrypted video conferences. The method 700 of FIG. 7 will be described with respect to the systems shown in FIG. 4; however any suitable system according to this disclosure may be employed, including any of the systems shown in FIG. 1-3 or 8.

At block 710, the video conference provider 410 initiates an encrypted video conference. In this example the encrypted video conference is initiated in response to a request received from a host client device 420; however, in some examples, the video conference provider 410 may initiate the encrypted video conference without such a request, e.g., by initiating the encrypted video conference at a scheduled meeting time, or in response to a request from a participant's client device 430 that is not the host.

At block 720, the video conference provider 410 receives and stores encrypted audio and video from the participants in the encrypted video conference. As discussed above with respect to FIG. 5, the host's client device 420 generates and distributes a meeting key to the various participants to enable them each to encrypted audio and video transmitted as a part of the encrypted video conference. In this example, the video conference provider 410 receives a request from the host's client device to record the meeting; however, in other examples, the video conference provider 410 initiates recording without a request, e.g., based on configuration settings for the video conference or based on a default requirement to record all video conferences.

To store the encrypted audio and video in this example, the video conference provider 410 stores the encrypted audio and video received from the participants in a data store and associates the stored encrypted audio and video with the video conference. For example, the video conference provider 410 may store additional information with the encrypted audio and video, which may include one or more of the following: a reference to a video conference record stored in by the video conference provider, the video conference meeting identifier, the date and time that the video conference was scheduled to begin, the host's name, a host account identifier, a customer identifier, etc.

At block 730, the video conference provider 410 provides multiplexed encrypted streams of audio and video the participants. Despite the various audio and video streams being encrypted, the video conference provider 410 can determine the origin of each audio and video stream, e.g., based on a network connection or port on which the respective stream was received or based on unencrypted information transmitted along with the audio and video streams, such information about the participant or client device that generated the audio or video stream. To multiplex the audio and video, the video conference providers 410 accepts the encrypted audio and video streams from the various participants and, for each participant, transmits the audio and video streams from the other participants to the respective participant to each participant receives the audio and video streams from the other participants. In some examples, the video conference provider 410 may also transmit the audio and video stream from the participant itself so that every participant receives all audio and video streams.

At block 740, the video conference provider 410 receives and stores an encrypted meeting cryptographic key. As discussed above with respect to FIG. 5, the host client device 420 generates and distributes a meeting cryptographic key that the participants can use to encrypt the audio and video transmitted during the video conference, and that the host client device 420 encrypts the meeting cryptographic key. The video conference provider 410 receives the encrypted meeting cryptographic key and stores it in a data store.

At block 750, the video conference provider associates the encrypted audio and video with the encrypted meeting cryptographic key. For example, as discussed above, the video conference provider 410 may associate the stored encrypted audio and video with information to identify the corresponding video conference. The video conference provider 410 may similarly associate the encrypted meeting cryptographic key with the video conference or the stored encrypted audio and video, such as by storing additional information as described above with respect to block 720 or by storing the encrypted meeting cryptographic key in a data store record corresponding to the video conference.

In some examples, the video conference provider 410 may receive multiple encrypted meeting cryptographic keys during the course of an encrypted video conference, as discussed above with respect to FIGS. 5 and 6. In response to receiving successive encrypted meeting cryptographic keys, the video conference provider 410 stores each such received key and associates it with the encrypted audio and video as discussed above. In some examples, the video conference provider 410 may also receive indications identifying when each encrypted meeting cryptographic key began being used, e.g., by providing a corresponding timestamp. Such additional information may also be stored and associated with the encrypted audio and video.

At block 760, the video conference provider 410 receives a request for the stored encrypted audio and video and for the encrypted meeting cryptographic key(s). In this example, the video conference provider 410 only will accept requests for the stored encrypted information once the video conference has concluded. However, in some examples, such requests may be received while the video conference is on-going. Further, in some examples, the video conference provider 410 may only provide the stored encrypted information to an authorized user, e.g., to the host of the video conference or to a user associated with an account associated with the stored encrypted information.

At block 770, the video conference provider 410 provides the stored encrypted audio and video and the stored encrypted meeting cryptographic key(s) in response to the request. Further, if additional information is available, such as transition timestamps between meeting encryptions keys, the video conference provider 410 may also provide such information in response to a request for the stored audio and video and the stored encrypted meeting cryptographic key.

Figure 8:
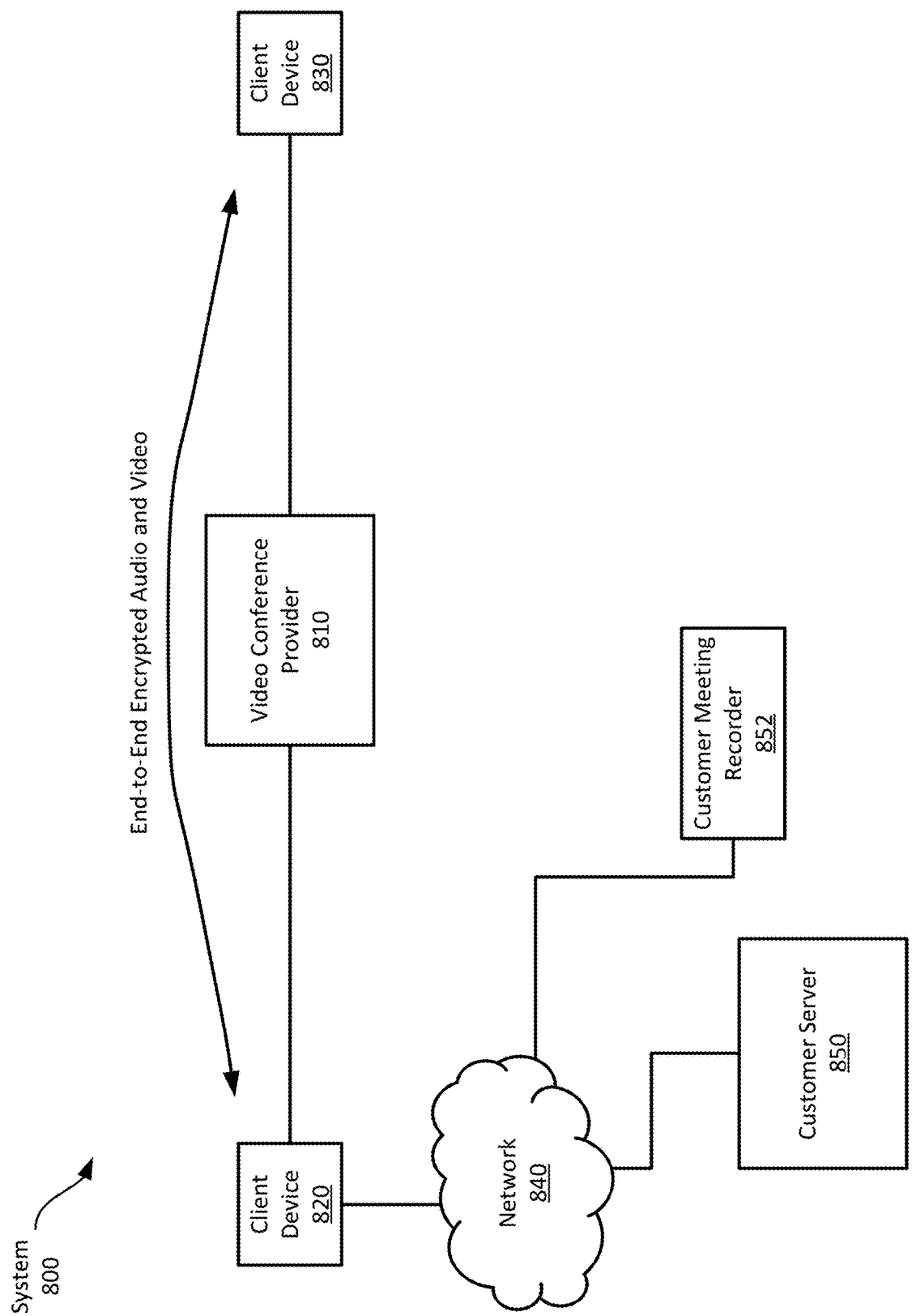
FIG. 8 shows an example system for securely recording and retrieving encrypted video conferences.

Referring now to FIG. 8, FIG. 8 shows another example system 800 for securely recording and retrieving encrypted video conferences. This example system 800 includes a host client device 820 and a participant client device 830. The host client device 820 communicates with the video conference provider 810 to initiate a new video conference. In this example, however, rather than sending a message to the video conference provider to record the encrypted audio and video, instead, the host has invited an automated account to join the video conference as a participant and record the video conference. For example, the host's client device 820 may be connected to a private network 840 at their place of employment, which is a customer of the video conference provider 810, and may transmit a message to the customer server 450 notifying it of the meeting and providing information to enable it to access the video conference, e.g., a meeting identifier, a passcode, and a scheduled date and time for the meeting. The customer server 450 may then, at the scheduled time, cause an automated process to connect to the video conference using the supplied meeting identifier and passcode.

Once the automated process is connected to the video conference provider and joins the meeting, it will be treated as a participant by the video conference provider 810 and will receive meeting cryptographic keys as any other participant would, generally as described above with respect to FIGS. 4-5. Because the automated process has access to the unencrypted audio and video by using the meeting key, it can record the audio and video and encode it into a suitable format, e.g., mp4, for subsequent distribution. Thus, the system 800 can enable recording of E2E-encrypted video conferences without opening the video conference to the video conference provider 810 to record.

Figure 9:
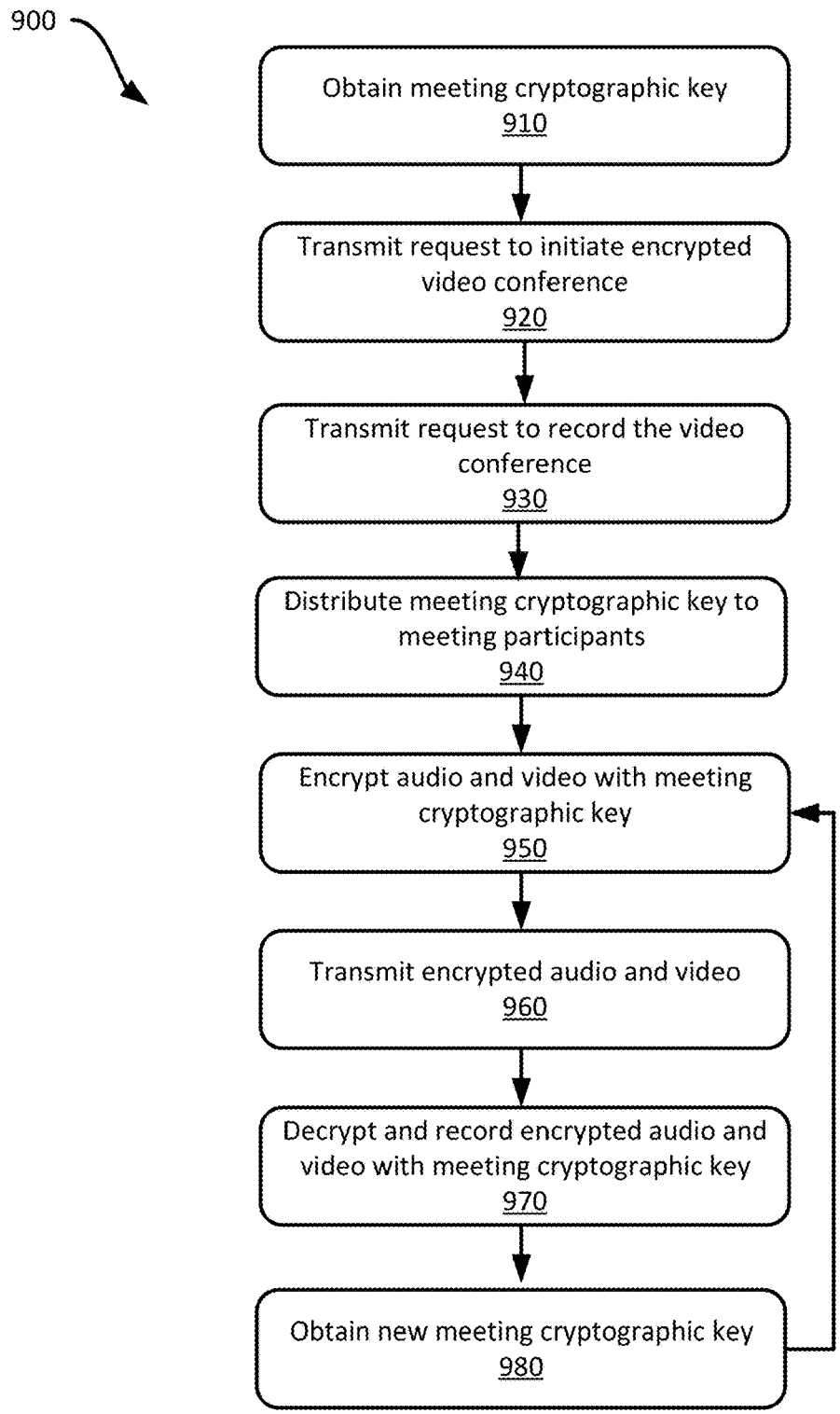
FIGS. 9-10 show example methods for securely recording and retrieving encrypted video conferences.

Referring now to FIG. 9, FIG. 9 shows an example method 900 for securely recording and retrieving encrypted video conferences. The method 900 of FIG. 9 will be described with respect to the system shown in FIG. 8; however any suitable system according to this disclosure may be employed, including any of the systems shown in FIGS. 1-3.

At block 910, the host's client device 820 obtains a meeting cryptographic key generally as described above with respect to block 510 in FIG. 5.

At block 920, the host's client device 820 transmits a request to initiate an encrypted video conference generally as described above with respect to block 520.

At block 930, the host's client device 820 transmits a request to record the video conference to the customer server 850. In this example, the client device 820 transmits the request once the meeting has begun. The request includes information to enable the customer server 850 to join the video conference, such as a meeting identifier and passcode or a URL link to the meeting. The request also indicates whether the meeting has started or include a scheduled start time for the meeting. In response to the request, the customer server 850 causes an automated process, e.g., customer meeting recorder 852, to join the video conference using the supplied information, e.g., the meeting identifier and passcode.

At block 940, the host's client device 820 distributes the meeting cryptographic key to the meeting participants generally as described above with respect to block 530. Because the customer meeting recorder 852 discussed above has joined the video conference as a participant, it will also receive a copy of the meeting cryptographic key and can therefore receive and decrypt the encrypted audio and video of the video conference.

At block 950, the host's client device 820, as well as the other participants, e.g., client device 830, encrypt the audio and video captured by the host's client device's microphone and camera using the meeting cryptographic key generally as described above with respect to block 580.

At block 960, the host's client device 820, as well as the other participants, transmits its encrypted audio and video to the video conference provider 810, generally as described above with respect to block 582.

At block 970, each participant decrypts received encrypted audio and video. In particular, the customer meeting recorder 852 receives and decrypts encrypted audio and video from the various meeting participants, optionally encodes it into a suitable format, and stores the decrypted audio and video (encoded or not) onto a data store, such as its own local data store or at a remote computing device, e.g., customer server 450.

At block 980, the host's client device 820 optionally obtains a new meeting cryptographic key generally as described above with respect to block 584, and, transitions the participants to the new meeting cryptographic key.

Once the meeting has concluded, the customer meeting recorder 852 can store the recorded audio and video to a suitable location for subsequent authorized retrieval. Because the recording was handled entirely by the customer itself, it is able to control the access to the recording and ensure that only authorized users are able to access its contents.

Figure 10:
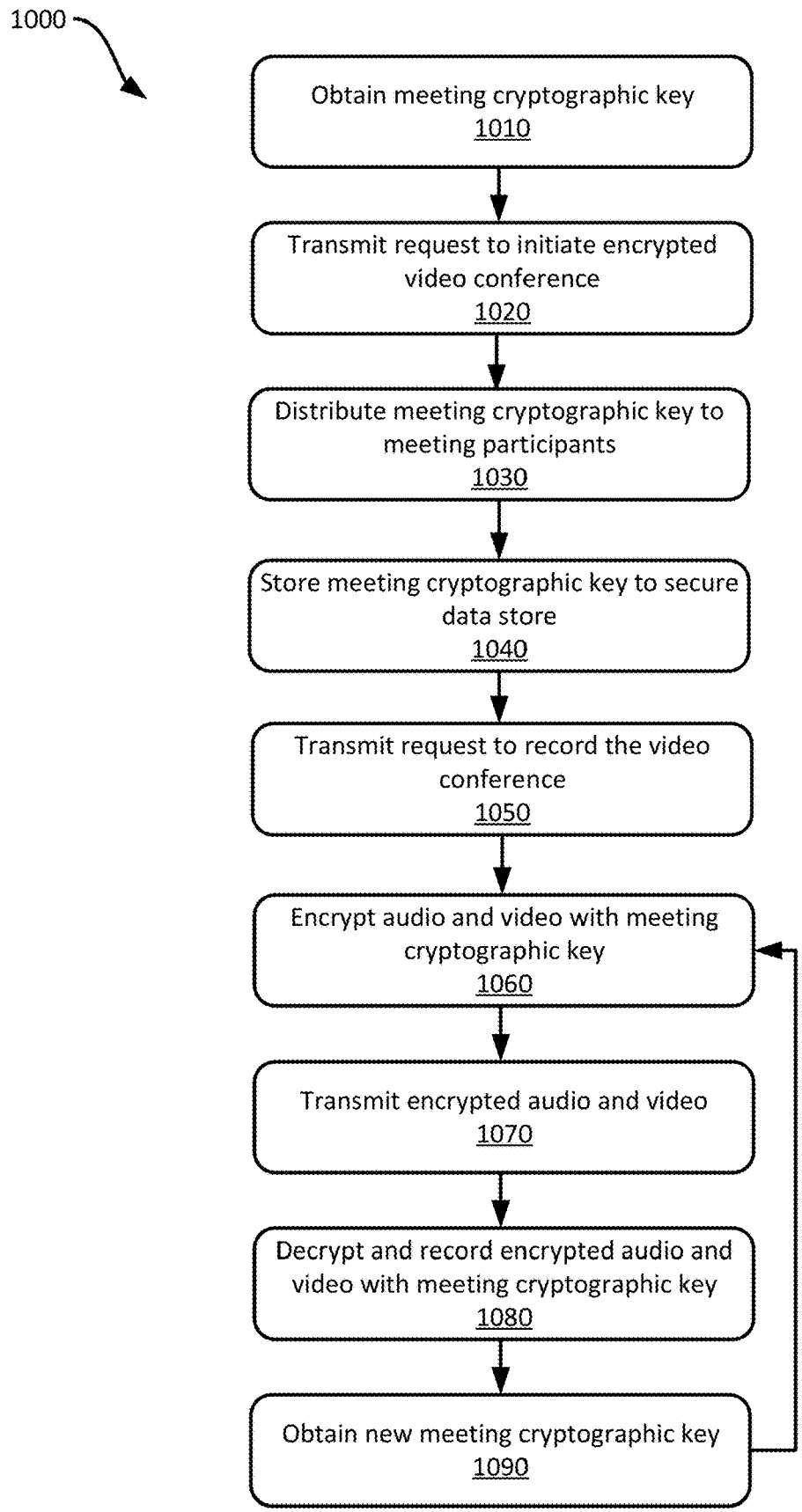

Referring now to FIG. 10, FIG. 10 shows an example method 900 for securely recording and retrieving encrypted video conferences. The method 900 of FIG. 9 will be described with respect to the system shown in FIG. 4; however any suitable system according to this disclosure may be employed, including any of the systems shown in FIG. 1-3 or 8.

Blocks 1010-1030 are performed generally as described above with respect to blocks 510-530 in FIG. 5.

At block 1040, the host's client device 420 transmits the meeting cryptographic key to the customer server 450 to store in a secure database, e.g., an encrypted database, along with information to identify the video conference, e.g., a meeting identifier, passcode, scheduled start time for the video conference, the host's name, a customer account with the video conference provider, etc. Such information is also stored in the secure database and associated with the meeting cryptographic key. In some examples, the meeting cryptographic key may be separately encrypted, such as by using the process described above with respect to FIG. 5 in which the host's client device requests a public cryptographic key from the customer server. If the meeting cryptographic key is encrypted, the customer server 450 may also store a reference to the corresponding private cryptographic key to enable decrypting of the meeting cryptographic key.

At block 1050, the host's client device 420 transmits a request to record the meeting to the video conference provider 410 generally as described above with respect to block 560. In this example, however, the host's client device 420 does not transmit an encrypted copy of the meeting cryptographic key to the video conference provider 410. Instead, as discussed above, the meeting cryptographic key has been stored by the customer server 450.

Blocks 1060 through 1090 proceed generally as described above with respect to blocks 582-584; however, in the event a new meeting cryptographic key is generated, it is provided to the customer server 450 to be stored as described above with respect to block 1040, rather than to the video conference provider 410.

Once the video conference has concluded, the customer server 450 may request a copy of the encrypted audio and video, generally as described in blocks 610-630 of FIG. 6; however, because the meeting cryptographic key(s) are stored by the customer server 450, it does not request them from the video conference provider 410.

Figure 11:
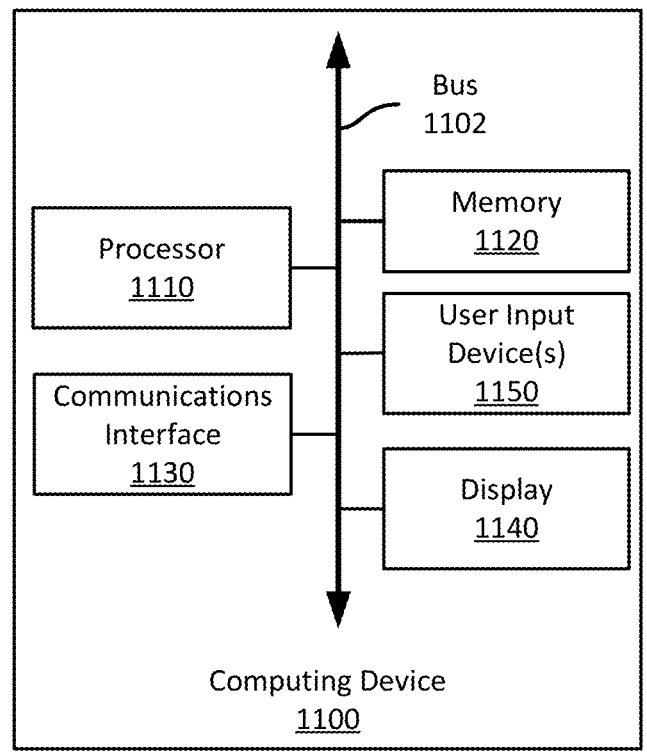
FIG. 11 shows an example computing device suitable for use with any system or method for securely recording and retrieving encrypted video conferences according to this disclosure.

Referring now to FIG. 11, FIG. 11 shows an example computing device 1100 suitable for use in example systems or methods for suggesting user actions during a video conference according to this disclosure. The example computing device 1100 includes a processor 1110 which is in communication with the memory 1120 and other components of the computing device 1100 using one or more communications buses 1102. The processor 1110 is configured to execute processor-executable instructions stored in the memory 1120 to execute an intuitive assistant 1100 according to this disclosure or to perform one or more methods for suggesting user actions during a video conference according to different examples, such as part or all of the example methods 500-700, 900, 1000 described above with respect to FIGS. 5-7, 9, and 10. The computing device, in this example, also includes one or more user input devices 1150, such as a keyboard, mouse, touchscreen, video capture device, microphone, etc., to accept user input. The computing device 1100 also includes a display 1140 to provide visual output to a user.

The computing device 1100 also includes a communications interface 1140. In some examples, the communications interface 1130 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, That which is claimed is:

1. A method comprising:
initiating, by a video conference provider, an end-to-end ("E2E") encrypted video conference;
recording, by the video conference provider, encrypted audio or video streams from a plurality of participants in the video conference, the encrypted audio or video streams encrypted by the respective participants using a meeting cryptographic key, wherein the video conference provider does not have access to the meeting cryptographic key; and
receiving and storing an encrypted meeting cryptographic key associated with the recorded encrypted audio and video streams.

2. The method of claim 1, further comprising:
receiving and storing, by the video conference provider, a second encrypted meeting cryptographic key associated with the recorded encrypted audio and video streams; and
wherein a first portion of the recorded encrypted audio and video streams is encrypted using the first meeting cryptographic key and a second portion of the recorded encrypted audio and video streams is encrypted using the second meeting cryptographic key.

3. The method of claim 2, further comprising:
receiving and storing, by the video conference provider, an indication of a transition from the first meeting cryptographic key and the second meeting cryptographic key; and
associating the indication of the transition with the recorded encrypted audio and video streams.

4. The method of claim 1, further comprising:
receiving a request for the recorded encrypted audio or video streams;
obtaining the encrypted meeting cryptographic key associated with the recorded encrypted audio or video streams; and
providing the recorded encrypted audio or video streams and the encrypted meeting cryptographic key associated with the recorded encrypted audio or video streams.

5. The method of claim 4, wherein the encrypted meeting cryptographic key is one of a plurality of encrypted meeting cryptographic keys associated with the recorded encrypted audio or video streams, and further comprising:
obtaining the plurality of encrypted meeting cryptographic keys associated with the recorded encrypted audio or video streams;
obtaining indications identifying when each encrypted meeting cryptographic key was used to record encrypted audio or video streams; and
providing the plurality of encrypted meeting cryptographic keys associated with the recorded encrypted audio or video streams and the indications identifying when each encrypted meeting cryptographic key was used to record encrypted audio or video streams.

6. The method of claim 1, wherein the meeting cryptographic key is a symmetric encryption key.

7. The method of claim 1, wherein the encrypted meeting cryptographic key is encrypted using an encryption key of an asymmetric key pair.

8. A system comprising:
a non-transitory computer-readable medium;
a communications interface; and
a processor communicatively coupled to the non-transitory computer-readable medium and the communications interface, the processor configured to execute processor-executable instructions stored in the non-transitory computer-readable medium to:
initiate, by a video conference provider, an end-to-end ("E2E") encrypted video conference;
record, by the video conference provider, encrypted audio or video streams from a plurality of participants in the video conference, the encrypted audio or video streams encrypted by the respective participants using a meeting cryptographic key, wherein the video conference provider does not have access to the meeting cryptographic key; and
receive and store an encrypted meeting cryptographic key associated with the recorded encrypted audio and video streams.

9. The system of claim 8, wherein the processor is configured to execute further processor-executable instructions stored in the non-transitory computer-readable medium to:
receive and store a second encrypted meeting cryptographic key associated with the recorded encrypted audio and video streams; and
wherein a first portion of the recorded encrypted audio and video streams is encrypted using the first meeting cryptographic key and a second portion of the recorded encrypted audio and video streams is encrypted using the second meeting cryptographic key.

10. The system of claim 9, wherein the processor is configured to execute further processor-executable instructions stored in the non-transitory computer-readable medium to:
receive and store, by the video conference provider, an indication of a transition from the first meeting cryptographic key and the second meeting cryptographic key; and
associating the indication of the transition with the recorded encrypted audio and video streams.

11. The system of claim 8, wherein the processor is configured to execute further processor-executable instructions stored in the non-transitory computer-readable medium to:
receiving a request for the recorded encrypted audio or video streams;
obtaining the encrypted meeting cryptographic key associated with the recorded encrypted audio or video streams; and
providing the recorded encrypted audio or video streams and the encrypted meeting cryptographic key associated with the recorded encrypted audio or video streams.

12. The system of claim 11, wherein the encrypted meeting cryptographic key is one of a plurality of encrypted meeting cryptographic keys associated with the recorded encrypted audio or video streams, and wherein the processor is configured to execute further processor-executable instructions stored in the non-transitory computer-readable medium to:

obtaining the plurality of encrypted meeting cryptographic keys associated with the recorded encrypted audio or video streams;

obtaining indications identifying when each encrypted meeting cryptographic key was used to record encrypted audio or video streams; and providing the plurality of encrypted meeting cryptographic keys associated with the recorded encrypted audio or video streams and the indications identifying when each encrypted meeting cryptographic key was used to record encrypted audio or video streams.

13. The system of claim 8, wherein the meeting cryptographic key is a symmetric encryption key.

14. The system of claim 8, wherein the encrypted meeting cryptographic key is encrypted using an encryption key of an asymmetric key pair.

15. A non-transitory computer-readable medium comprising processor-executable instructions configured to cause one or more processors to:

initiate, by a video conference provider, an end-to-end ("E2E") encrypted video conference;

record, by the video conference provider, encrypted audio or video streams from a plurality of participants in the video conference, the encrypted audio or video streams encrypted by the respective participants using a meeting cryptographic key, wherein the video conference provider does not have access to the meeting cryptographic key; and receive and store an encrypted meeting cryptographic key associated with the recorded encrypted audio and video streams.

16. The non-transitory computer-readable medium of claim 15, further comprising processor-executable instructions configured to cause one or more processors to:

receive and store a second encrypted meeting cryptographic key associated with the recorded encrypted audio and video streams; and wherein a first portion of the recorded encrypted audio and video streams is encrypted using the first meeting cryptographic key and a second portion of the recorded encrypted audio and video streams is encrypted using the second meeting cryptographic key.

17. The non-transitory computer-readable medium of claim 16, further comprising processor-executable instructions configured to cause one or more processors to:

receive and store, by the video conference provider, an indication of a transition from the first meeting cryptographic key and the second meeting cryptographic key; and associate the indication of the transition with the recorded encrypted audio and video streams.

18. The non-transitory computer-readable medium of claim 15, further comprising processor-executable instructions configured to cause one or more processors to:

receive a request for the recorded encrypted audio or video streams;

obtain the encrypted meeting cryptographic key associated with the recorded encrypted audio or video streams; and provide the recorded encrypted audio or video streams and the encrypted meeting cryptographic key associated with the recorded encrypted audio or video streams.

19. The non-transitory computer-readable medium of claim 18, wherein the encrypted meeting cryptographic key is one of a plurality of encrypted meeting cryptographic keys associated with the recorded encrypted audio or video streams, and further comprising processor-executable instructions configured to cause one or more processors to:

obtain the plurality of encrypted meeting cryptographic keys associated with the recorded encrypted audio or video streams;

obtain indications identifying when each encrypted meeting cryptographic key was used to record encrypted audio or video streams; and provide the plurality of encrypted meeting cryptographic keys associated with the recorded encrypted audio or video streams and the indications identifying when each encrypted meeting cryptographic key was used to record encrypted audio or video streams.

20. The non-transitory computer-readable medium of claim 15, wherein the encrypted meeting cryptographic key is encrypted using an encryption key of an asymmetric key pair.

* * * * *